United States Patent
Teshome et al.

(10) Patent No.: US 12,476,794 B2
(45) Date of Patent: Nov. 18, 2025

(54) MANAGING DATA PROCESSING SYSTEMS IN A DISTRIBUTED ENVIRONMENT USING A MANAGEMENT CONTROLLER

(71) Applicant: Dell Products L.P., Round Rock, TX (US)

(72) Inventors: Abeye Teshome, Austin, TX (US); Richard M. Tonry, Georgetown, TX (US); Bassem El-Azzami, Austin, TX (US); Mohit Arora, Frisco, TX (US); Vinodkumar Vasudev Ottar, Mckinney, TX (US); Luis Antonio Valencia Reyes, Waxahachie, TX (US); Adolfo Sandor Montero, Pflugerville, TX (US); Amy Christine Nelson, Round Rock, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 146 days.

(21) Appl. No.: 18/498,258

(22) Filed: Oct. 31, 2023

(65) Prior Publication Data
US 2025/0141661 A1 May 1, 2025

(51) Int. Cl.
*H04L 9/08* (2006.01)
*H04L 9/32* (2006.01)

(52) U.S. Cl.
CPC .......... *H04L 9/0819* (2013.01); *H04L 9/3247* (2013.01)

(58) Field of Classification Search
CPC ............................ H04L 9/0819; H04L 9/3247
See application file for complete search history.

(56) References Cited

U.S. PATENT DOCUMENTS

| 7,599,907 B2 | 10/2009 | Havewala et al. |
| 8,020,192 B2 | 9/2011 | Wright et al. |
| 8,490,163 B1 | 7/2013 | Harsell et al. |

(Continued)

OTHER PUBLICATIONS

Venture, Patrick. "In-Band Update of BMC Firmware (and others) using OEM IPMI Blob Transport", Oct. 18, 2018; pp. 1-10; retrieved from http://gerrit.openbmc.org/plugins/gitiles/openbmc/docs/+/838fa962b73deb1ef7908ee8dfa1203fa5263517/designs/firmware_update_via_blobs.me on May 19, 2025 (year:2018) (10 pages).

*Primary Examiner* — Gil H. Lee
(74) *Attorney, Agent, or Firm* — WOMBLE BOND DICKINSON (US) LLP

(57) ABSTRACT

Methods and systems for registering a management controller of a data processing system with a server and an orchestrator are disclosed. To do so, a key pair may be generated by the management controller and a private key of the key pair may be kept secret by the management controller. Previously established trust between a trusted platform module of the data processing system and a manufacturer of the data processing system may be leveraged to register the management controller with the server. Hardware resources of the data processing system may register a public key of the key pair with the server and may request registration of the management controller with the orchestrator. The management controller may obtain a challenge from an internet of things hub associated with the orchestrator and may respond to the challenge, via an out of band communication channel, to complete the registration of the management controller.

20 Claims, 7 Drawing Sheets

(56) References Cited

U.S. PATENT DOCUMENTS

| | | |
|---|---|---|
| 8,850,186 B2 | 9/2014 | Yamauchi |
| 9,122,866 B1 | 9/2015 | Kolman |
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,395,039 B2 | 8/2019 | Khatri et al. |
| 10,630,489 B2 | 4/2020 | Hughes |
| 10,678,555 B2 | 6/2020 | Johansson et al. |
| 10,841,295 B1 | 11/2020 | Pecen et al. |
| 11,563,565 B2 | 1/2023 | Yang et al. |
| 11,704,384 B2 | 7/2023 | Murphy et al. |
| 11,909,575 B1 | 2/2024 | Mehrota |
| 2007/0006282 A1* | 1/2007 | Durham ............... H04L 9/3234 726/2 |
| 2009/0259848 A1 | 10/2009 | Williams |
| 2012/0240204 A1 | 9/2012 | Bhatnagar |
| 2014/0380444 A1 | 12/2014 | Kelley |
| 2017/0161501 A1* | 6/2017 | Sood ..................... G06F 21/10 |
| 2017/0277876 A1 | 9/2017 | Alameh et al. |
| 2017/0289197 A1 | 10/2017 | Mandyam et al. |
| 2018/0004954 A1* | 1/2018 | Liguori .................... H04L 9/14 |
| 2018/0006829 A1 | 1/2018 | Kravitz et al. |
| 2018/0041510 A1 | 2/2018 | Burch |
| 2019/0095593 A1 | 3/2019 | Cisneros |
| 2019/0156019 A1 | 5/2019 | Chen |
| 2020/0067922 A1 | 2/2020 | Avetisov |
| 2021/0019392 A1 | 1/2021 | Changanti |
| 2021/0336772 A1 | 10/2021 | Debata |
| 2022/0222328 A1 | 7/2022 | Talib et al. |
| 2023/0261859 A1 | 8/2023 | Bryden |
| 2023/0403269 A1* | 12/2023 | Valkaitis ................ G06F 21/32 |
| 2024/0411938 A1 | 12/2024 | Emerson |

* cited by examiner

MANAGING DATA PROCESSING SYSTEMS IN A DISTRIBUTED ENVIRONMENT USING A MANAGEMENT CONTROLLER

FIELD

Embodiments disclosed herein relate generally to managing data processing systems. More particularly, embodiments disclosed herein relate to systems and methods to manage data processing systems in a distributed environment using at least a management controller.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
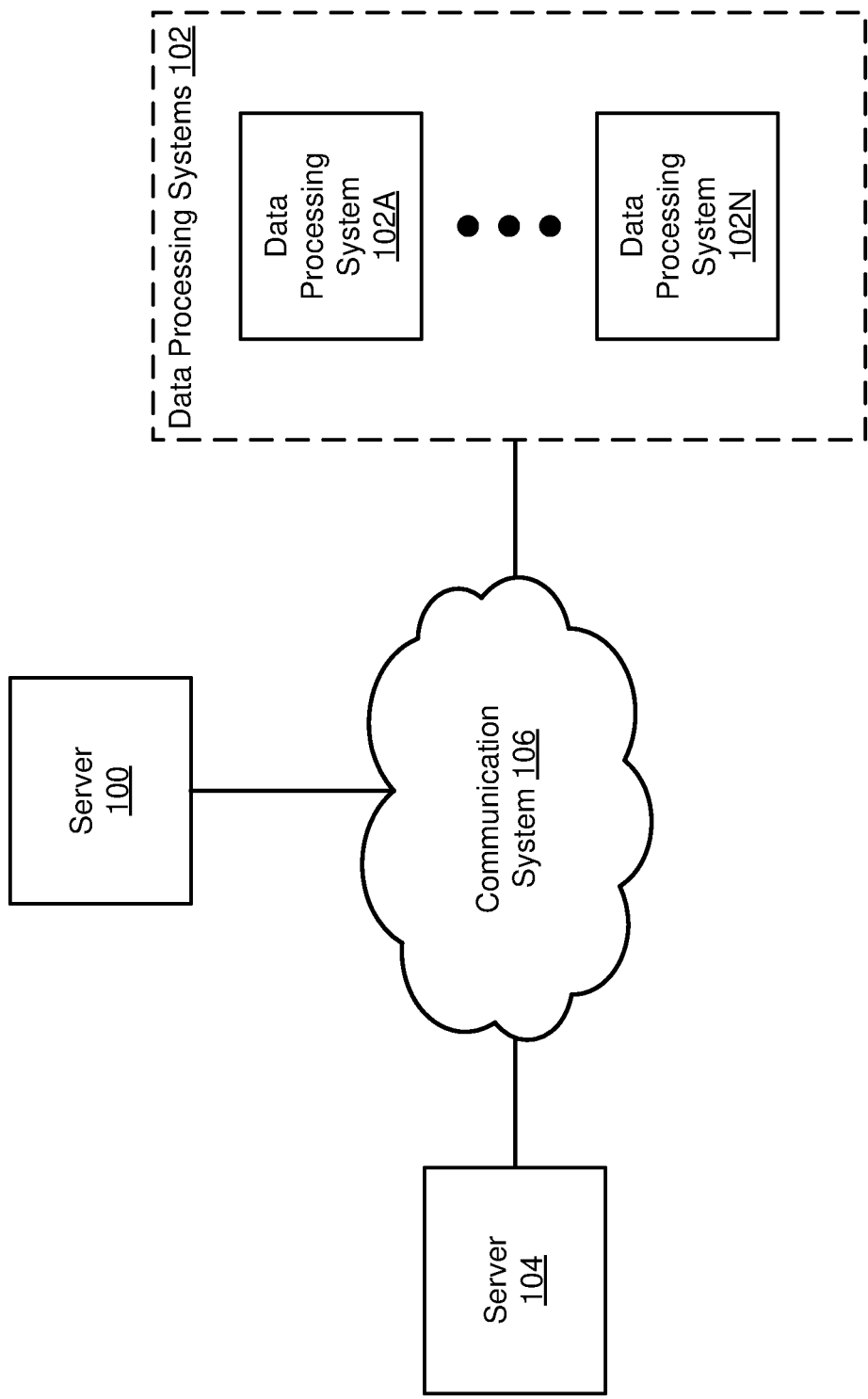
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services to any type and number of other devices and/or users of the data processing systems. The computer-implemented services may include any quantity and type of such services.

The data processing systems may operate in a distributed environment in which the computer-implemented services are cooperatively provided by entities throughout the distributed environment. To cooperatively perform the computer-implemented services, the entities (e.g., the data processing systems, servers) may exchange information during any number of interactions. However, the computer-implemented services may not be provided as desired (e.g., by downstream consumers of the computer-implemented services) if the data processing systems and/or the interactions between the entities are compromised. To reduce a likelihood of compromise (e.g., by a malicious entity) of the interactions, trust may be established between the entities prior to the interactions.

To establish trust between the entities and, therefore, increase security of the interactions, each data processing system of the data processing systems may include a management controller and a trusted platform module (TPM). A data processing system may, therefore, leverage: (i) previously established trust between the TPM and a manufacturer of the data processing system, and (ii) generation of a public private key pair by the management controller to facilitate secure communications between the entities.

The management controller may manage operation of the data processing system regardless of a state (e.g., powered or unpowered) of hardware resources of the data processing system. Therefore, establishing trust between the entities may include registration of the management controller as a trusted entity with any services with which the data processing system interacts.

For example, consider a scenario in which the data processing system interacts with two services (e.g., an orchestrator and an identity verification service) to manage the operation of the data processing system. The data processing system may leverage a shared secret known by the TPM and the manufacturer to register the management controller with the identity management service. To register the management controller with the orchestrator, the management controller may generate a public private key pair and my not disclose the private key to any other entities. The public key of the public private key pair may be distributed to the identity management service and the orchestrator.

Subsequently, the data processing system may provide a data package to the orchestrator that is signed using the private key. While the orchestrator may verify the signature using the public key, the orchestrator may directly communicate with the management controller, via an out of band communication channel, to issue a challenge to the management controller. The management controller may respond to the challenge via the out of band communication channel thereby establishing trust between the three entities.

By doing so, a private key may be generated and used by the management controller to facilitate establishment of trust between entities in a distributed environment. Consequently, the entities throughout the distributed environment may be more likely to exchange trusted communications thereby increasing a likelihood of providing computer-implemented services as desired by downstream consumers.

In an embodiment, a method of registering a management controller of a data processing system is provided. The method may include: identifying an occurrence of a registration event for the management controller, the registration event indicating that the management controller is to be registered with a server and an orchestrator; registering the management controller with the server; registering, with the server, a public key of a public private key pair, a private key of the public private key pair being kept secret by the management controller, to prompt the server to initiate registration of the management controller with the orchestrator; obtaining an acknowledgement of initiation of the registration of the management controller with the orchestrator, the initiation being made by the server; based on the acknowledgement, providing, by hardware resources of the data processing system, a request to register the management controller to the orchestrator, the request comprising a payload signed by the management controller using the private key to continue the registration of the management controller; obtaining, by the management controller via an out of band communication channel, a challenge from the orchestrator as part of the registration of the management controller; providing, by the management controller and via the out of band communication channel, a response to the challenge to the orchestrator to complete the registration of the management controller with the orchestrator; and providing computer-implemented services using the completed registration.

Registering the management controller with the server may include: obtaining, by the hardware resources, an identifier for the management controller; verifying, by a trusted platform module (TPM) of the data processing system, a security posture of hardware resources of the data processing system; in an instance of the verifying where the security posture is acceptable: signing, by the TPM, the identifier using a second private key of a second public private key pair, the second private key being kept secret by the TPM and only being usable when the security posture is acceptable; providing, by the hardware resources, the signed identifier to the server; obtaining, by the hardware resources and responsive to the provided signed identifier, a notification regarding whether the management controller has been registered with the server, and while the management controller is registered with the server, the management controller communicates with the server directly via an out of band communication channel.

The management controller may be registered by the server using a second public key of the second public private key pair to verify that the second private key used to sign the signed identifier is the second private key of the second public private key pair.

During the registration of the management controller with the server, the server and the orchestrator may be in a trusted state.

The public private key pair may be generated by the management controller as part of registering the management controller with the orchestrator.

Registering the public key with the orchestrator may include performing a certificate signing request process.

The acknowledgement may include: information usable to direct communications to the orchestrator; and information that was previously provided to the orchestrator by the server during the initiation of the registration of the management controller with the orchestrator.

The challenge may include a request for the at least a portion of the information that was previously provided to the orchestrator by the server during the initiation of the registration of the management controller with the orchestrator.

Providing the request to register the management controller to the orchestrator may include: providing, by the hardware resources, the request to the management controller via a side band communication channel; signing, by the management controller, the request using the private key; and obtaining, by the hardware resources, the signed request from the management controller via the side band communication channel.

The data processing system may include a network module adapted to separately advertise network endpoints for the management controller and the hardware resources, the network endpoints being usable by the server and/or orchestrator to address communications to the hardware resources using an in band communication channel and the management controller using the out of band communication channel.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The network module may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
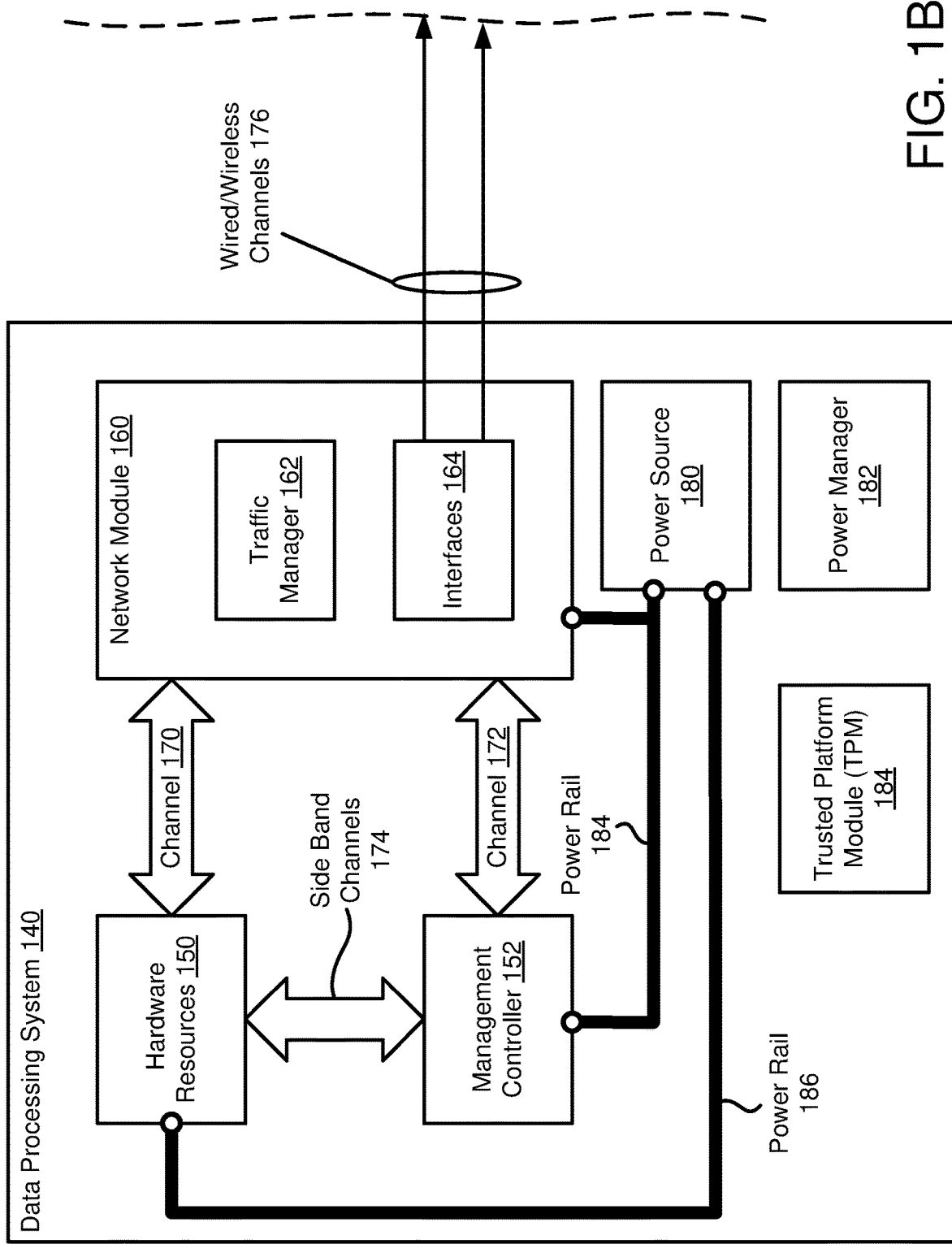
FIG. 1B shows a block diagram illustrating a data processing system in accordance with an embodiment.
Figure 1C:
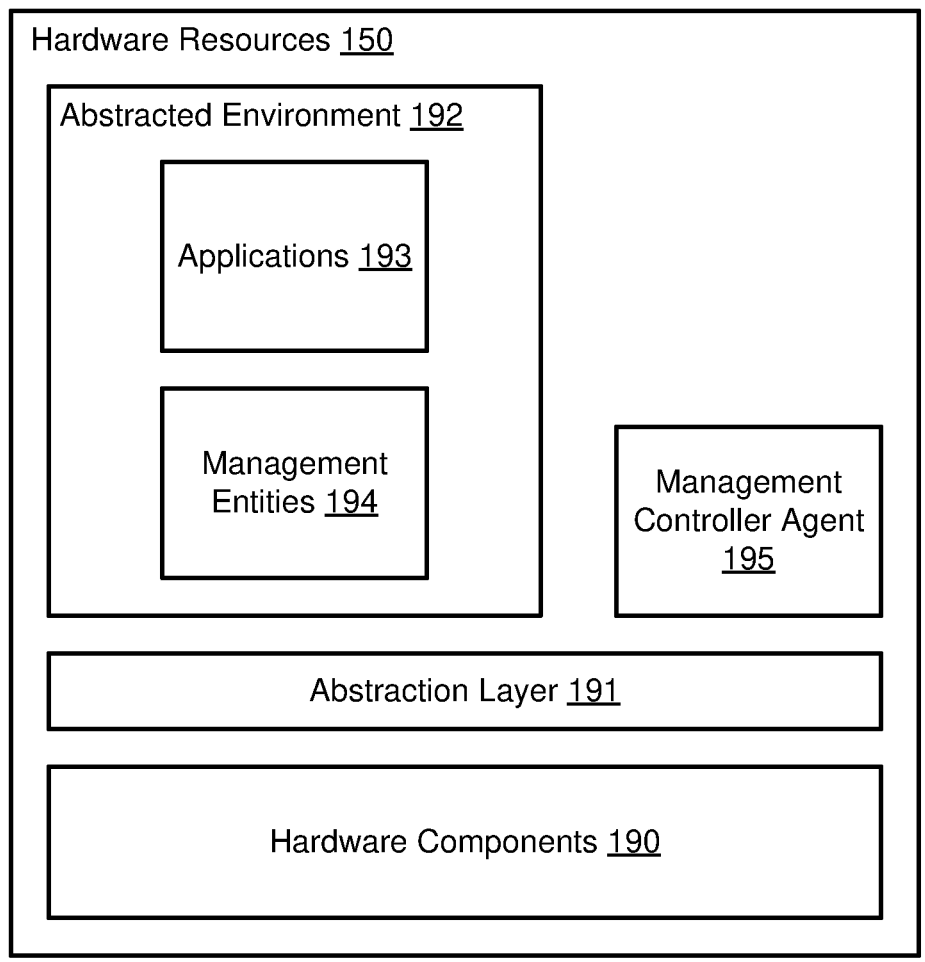
FIG. 1C shows a block diagram illustrating hardware resources of a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIGS. 1B-1C for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, server 100, server 104, data processing systems 102 and/or any other type of devices (not shown in FIG. 1A). Other types of computer-implemented services may be provided by the system shown in FIG. 1A without departing from embodiments disclosed herein.

The computer-implemented services may be provided, at least in part, by hardware resources of data processing systems 102 and the computer-implemented services may be desired by a user of data processing systems 102. Over time, the type and/or quantity of the computer-implemented services desired by the user may change. For example, a user of a data processing system (e.g., 102A) may purchase one or more subscriptions (e.g., a warranty, cloud storage), which may modify a list of entitlements for data processing system 102A. In order to accommodate modifications to the provided computer-implemented services, operation of the hardware resources and/or software components hosted by the hardware resources (e.g., applications) may be modified.

To update operation of the applications (and/or other components of the data processing system) and, therefore, to provide updated computer-implemented services, data processing system 102A may include a management controller. The management controller may operate independently from the hardware resources of data processing system 102A and may be distinct from the hardware resources. Therefore, the management controller may provide management functionalities for data processing system 102A regardless of a status of one or more in band components (e.g., the hardware resources).

In addition, the management controller may receive information from and/or provide information to remote entities (e.g., other data processing systems, servers) without the information traversing the in band components and without utilizing a network stack hosted by the hardware resources. To do so, data processing system 102A may include a network module.

The network module may facilitate in band communications for the hardware resources and out of band communications for the management controller by maintaining multiple network endpoints. For example, a first network endpoint may be usable to direct communications to and from the hardware resources via a first communication channel and a second network endpoint may be usable to direct communications to and from the management controller via a second communication channel.

By doing so, communications usable by the management controller to update the operation of data processing system 102A may not need to traverse any in band components and, therefore, may be less likely to be compromised in the event of compromise of one or more in band components. In addition, the management controller and network module may be powered by a separate power domain from the hardware resources and, therefore, may remain powered if the hardware resources are depowered. Doing so may increase the quality and/or availability of computer-implemented services to the user of data processing system 102A.

In a distributed environment, the computer-implemented services may be cooperatively provided by at least the components shown in FIG. 1A. To provide the computer-implemented services, the components of FIG. 1A may interact to, for example, manage the operation of data processing system 102A. The computer-implemented services may not be provided as desired if data processing system 102A, other components of FIG. 1A, and/or interactions between the components are compromised by a malicious entity.

In general, embodiments disclosed herein relate to systems, devices, and methods for establishing trust and, therefore, facilitating secure communications between entities in a distributed environment. To do so, a data processing system (e.g., 102A) may interact with at least two entities (e.g., server 100 and server 104) while providing the computer-implemented services. Data processing system 102A may include at least a management controller, a network module, and a TPM, the TPM having access to a shared secret also known to a manufacturer of data processing system 102A.

Figure 2A:
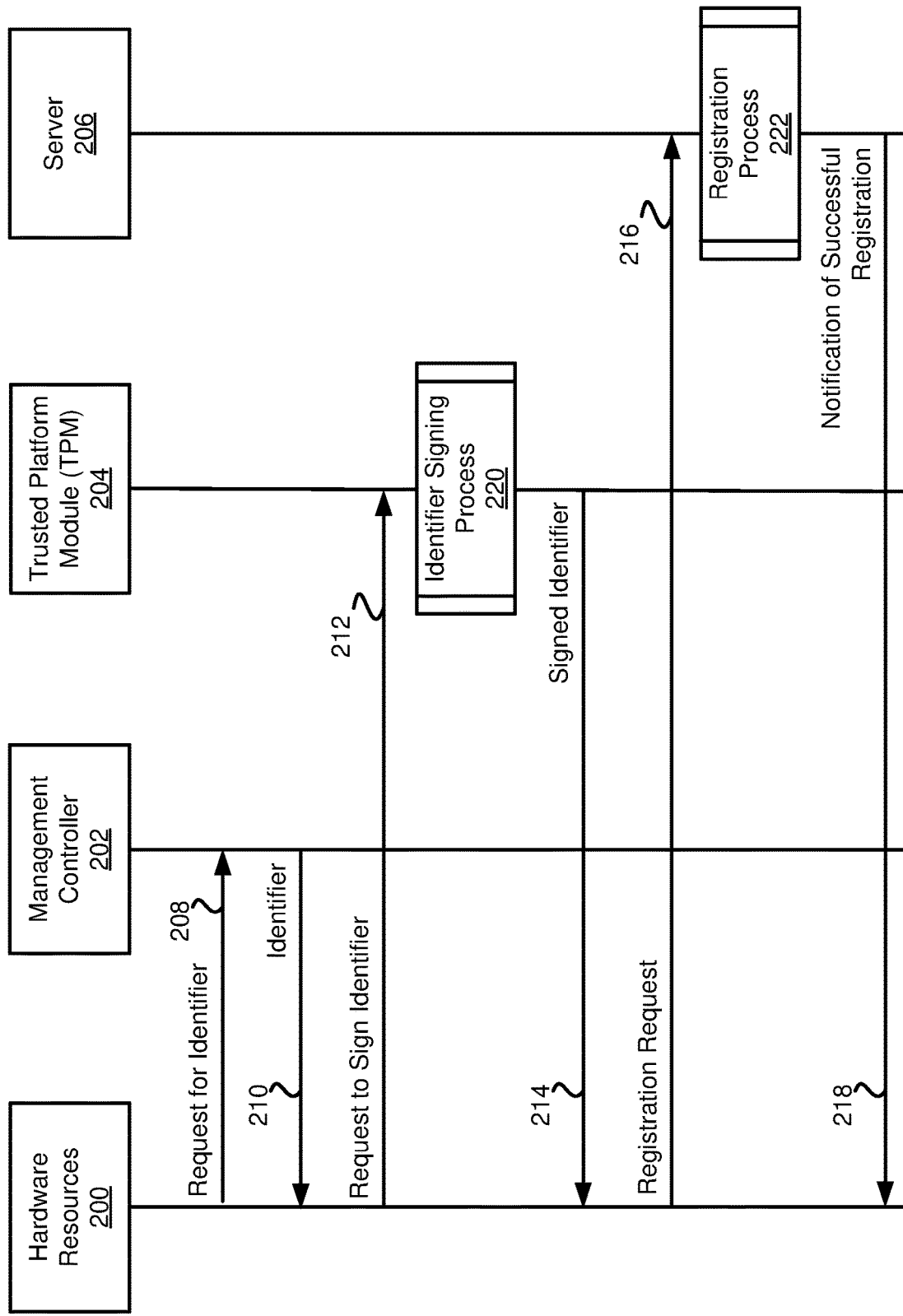
FIGS. 2A-2B show interaction diagrams in accordance with an embodiment.

Server 100 may be an identity verification service and data processing system 102A may leverage the TPM's shared secret to register the management controller with server 100. Doing so may establish the management controller as a trusted entity and may associate the management controller with data processing system 102A. Refer to FIG. 2A for additional details regarding registering the management controller with server 100.

Server 104 may include an orchestrator and an internet of things (IoT) hub (e.g., a message broker for interactions between the orchestrator and other entities in the distributed environment). To initiate registration of the management controller with server 104, the management controller may generate a public private key pair and hardware resources of data processing system 102A may register a public key of the public private key pair with server 100 (the identity verification service). Server 100 may interact with server 104 (e.g., they may be trusted entities at the time of registration of the management controller) and server 100 may provide server 104 with at least the public key.

Server 100 may notify the hardware resources to begin interactions with server 104 and the hardware resources may generate a registration request that is signed by the management controller using a private key of the public private key pair. Server 104 may verify the signature using the public key.

Figure 2B:
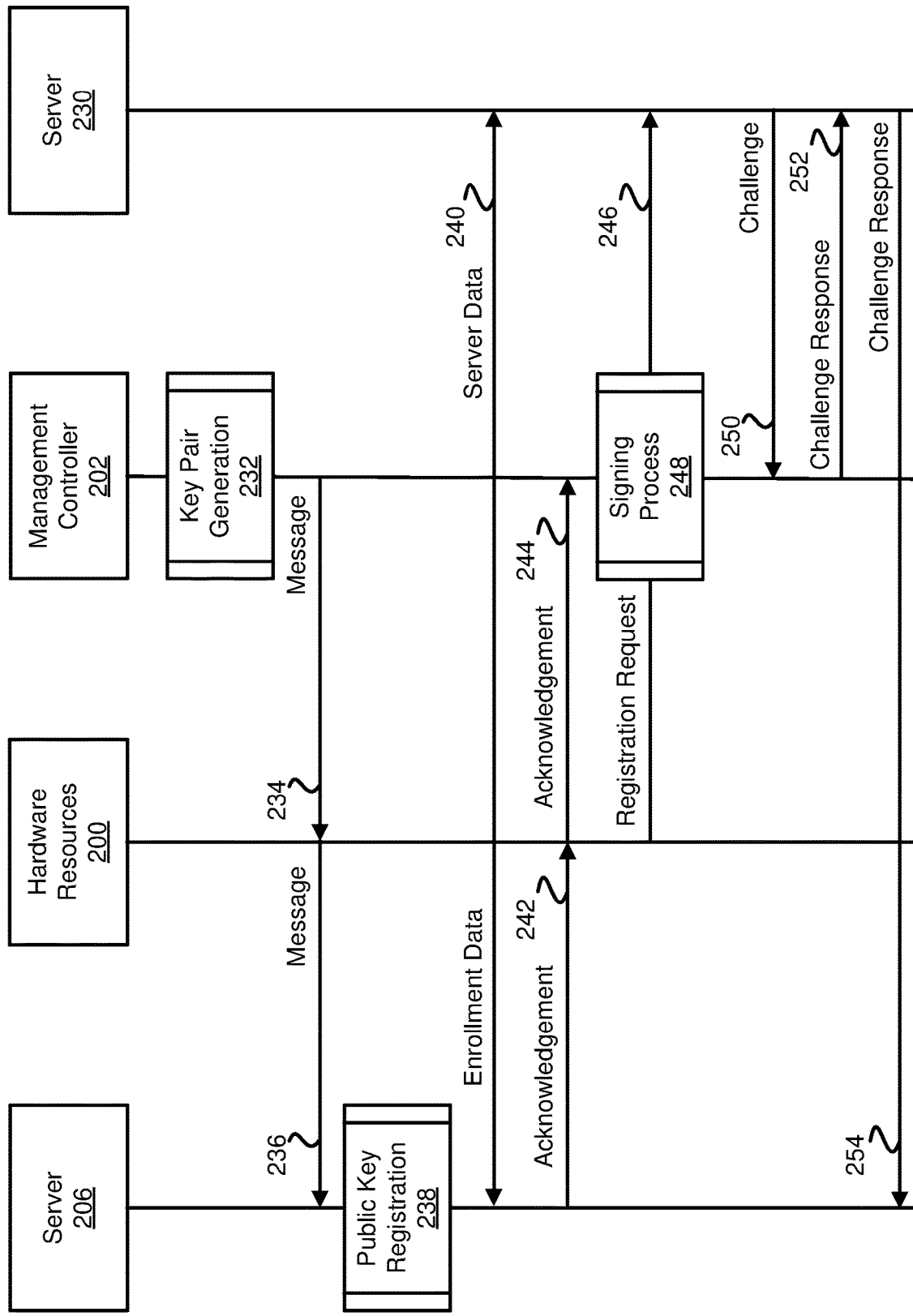

To complete the registration process, server 104 may provide a challenge to the management controller over an out of band communication channel which bypasses the hardware resources. The challenge may include a request for at least a portion of data that was provided by server 100 to server 104 previously. If the management controller successfully responds to the challenge, the registration may be complete and the components of FIG. 1A may cooperatively perform computer-implemented services. Refer to FIG. 2B for additional details regarding registering the management controller with server 104.

Server 100 may be implemented using a physical device that stores and manages device registrations, identity certificates, public keys (e.g., the manufacturer public key), and/or other information related to data processing systems 102. For example, server 100 may be an identity management service for the components of FIG. 1A.

Server 104 may be implemented using any number of physical devices including an orchestrator and an IoT hub. The orchestrator may manage device registrations, entitlement certificates, and/or other information related to data processing systems 102. For example, the orchestrator may communicate with management controllers of data processing systems 102 to implement changes to entitlements for data processing systems 102.

The IoT hub may include a message broker service that directs communications between the orchestrator and other components of FIG. 1A. For example, the IoT hub may be responsible for providing communications from the orchestrator to a particular management controller (e.g., of data processing system 102A) over a particular communication channel of communication system 106.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102, server 104, and server 100).

Communication system 106 may include out of band communication channels, in band communication channels, and/or other types of communication channels.

Refer to FIG. 1B for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer-implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in band components, such as hardware resources 150, of a host data processing system 140). Management controller 152 may provide various management functionalities for data processing system 140. For example, management controller 152 may monitor various ongoing processes performed by the in band components, may manage power distribution, thermal management, and/or other functions of data processing system 140.

To do so, management controller 152 may be operably connected to various components via side band channels 174 (in FIG. 1B, a limited number of side band channels are included for illustrative purposes, it will be appreciated that management controller 152 may communicate with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 140 via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in band components and out of band components (e.g., management controller 152) of data processing system. Specifically, an out of band communication channel (e.g., 172) that services management controller 152 and an in band communication channel (e.g., 170) that services hardware resources 150 may run through network module 160. Network module 160 may host a TCP/IP stack to facilitate network communications via the out of band communication channel. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in band components. Likewise, outbound traffic from the out of band component may never flow through the in band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in band components and out of band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

For management controller 152 to perform management functions for data processing system 140 via channel 172, management controller 152 may be registered as a trusted entity by entities of the distributed environment (e.g., server 100 and server 104 described in FIG. 1A). Prior to registering management controller 152 as a trusted entity for communications with server 100 and server 104, server 100 and server 104 may view management controller 152 as a separate entity from hardware resources 150 due to the separate network endpoint maintained by network module 160. Therefore, a registration process may be performed in order to associate management controller 152 with the data processing system and to establish trust between management controller 152 and the components.

To register management controller 152 as a trusted entity, TPM 184 may be utilized. TPM 184 may be implemented, for example, using a system on a chip or other type of independently operating computing device (e.g., independent from the in band components, such as hardware resources 150, of a host data processing system 140). TPM 184 may perform cryptographic operations for data processing system 140 including, for example, generation and/or maintenance of public private key pairs. TPM 184 may include functionality to perform other cryptographic operations such as random number generation, hash generation, and/or other functionalities.

To provide its functionality, data processing system 140 may: (i) identify an occurrence of a registration event for management controller 152, the registration event indicating that management controller 152 is to be registered with a server and an orchestrator, (ii) register management controller 152 with server 100 (e.g., by leveraging trust in TPM 184), (iii) register, with server 100, a public key of a public private key pair to prompt the server to initiate registration of management controller 152 with the orchestrator (e.g., server 104), (iv) obtain an acknowledgement of the initiation of the registration of management controller 152 with server 104, (v) provide, based on the acknowledgement and by hardware resources 150, a request to register management controller 152 to server 104, (vi) obtain, by management controller 152 and via an out of band communication channel, a challenge from server 104 as part of the registration of management controller 152, (vii) provide, by management controller 152 and via the out of band communication channel, a response to the challenge to server 104 to complete the registration of management controller 152 with the orchestrator, (viii) provide computer-implemented services using the completed registration, and/or (vi) perform other actions. Refer to FIGS. 2A-2B for additional details regarding registration of management controller 152 with server 100 and server 104.

Figure 3:
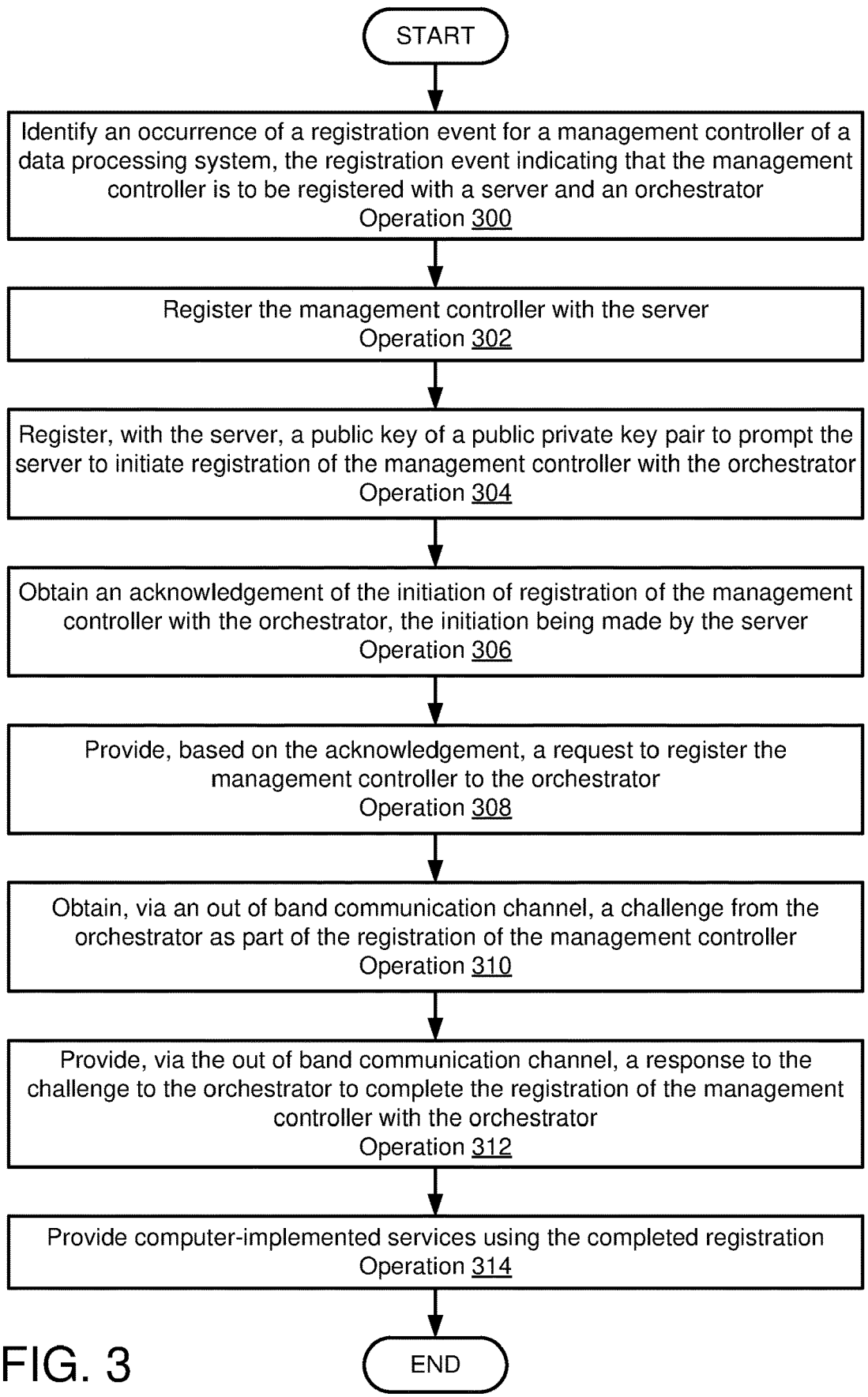
FIG. 3 shows a flow diagram illustrating a method of registering a management controller in accordance with an embodiment.

When providing its functionality, components of data processing system 140 may perform all, or a portion, of the methods and operations illustrated in FIGS. 2A-3.

While illustrated in FIG. 1B with a limited number of specific components, a system may include additional, fewer, and/or different components without departing from embodiments disclosed herein.

Turning to FIG. 1C, to provide computer-implemented services, hardware resources 150 may host applications 193 and management entities 194. Management entities 194 may include, for example, drivers, operating systems, and/or other entities that facilitate operation of applications 193 by facilitating use of hardware resources 150. Hardware resources 150 may include processors, memory modules, storage devices, and/or other types of hardware components usable to provide computer-implemented services.

Applications 193 may provide any quantity and type of computer-implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 191 and/or other entities, (vi) adjust distribution of use of hardware components 190 by the abstracted environment, and/or (vii) perform other types of management actions through which information regarding the operation of entities hosted by abstracted environment 192 may be collected.

As discussed above, the components of FIGS. 1A-1C may perform various methods to manage registration of a management controller of a data processing system. FIGS. 2A-3 may illustrate examples of methods that may be performed by the components of FIGS. 1A-1C. For example, a management controller similar to management controller 152 may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, interaction diagrams in accordance with an embodiment are shown in FIGS. 2A-2B. These interaction diagrams may illustrate how data may be obtained and used within the system of FIGS. 1A-1C.

In the interaction diagrams, processes performed by and interactions between components of a system in accordance with an embodiment are shown. In the diagrams, components of the system are illustrated using a first set of shapes (e.g., hardware resources 200, management controller 202, etc.), located towards the top of each figure. Lines descend from these shapes. Processes performed by the components of the system are illustrated using a second set of shapes (e.g., identifier signing process 220, etc.) superimposed over these lines. Interactions (e.g., communication, data transmissions, etc.) between the components of the system are illustrated using a third set of shapes (e.g., 208, 210, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 208 may occur prior to the interaction labeled as 210. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during registration of a management controller (e.g., 202) with a server (e.g., 206).

Prior to the processes and interactions depicted in FIG. 2A, a registration event may occur for management controller 202. The registration event may indicate that the data processing system (e.g., data processing system 140 described in FIG. 1B) is to be registered with a server and an orchestrator. For example, the registration event may include a setup process for data processing system 140 by a new user of data processing system 140.

Specifically, the new user may have recently purchased data processing system 140 and the registration event may occur as part of a setup process as the new user of data processing system 140. The new user may have purchased one or more subscriptions along with data processing system 140 (e.g., a warranty, cloud storage) and may wish to activate the one or more subscriptions following purchase of data processing system 140. To activate the one or more subscriptions, management controller 202 may be registered as a trusted entity to manage operation of data processing system 140.

Data processing system 140 may include hardware resources 200, management controller 202, and TPM 204. Each of these components is described in detail in FIGS. 1A-1C. Management controller 202 may perform management functions for data processing system 140 via interactions with a server (e.g., server 206). For example, management controller 202 may be responsible for managing the one or more subscriptions purchased by the new user (and/or other entitlements for data processing system 140). Server 206 may provide and/or manage identity certificates for data processing systems. Specifically, server 206 may be an identity management service for the distributed environment.

However, at the time of the occurrence of the registration event, server 206 may not view management controller 202 as a trusted entity associated with data processing system 140. Therefore, management controller 202 may require registration with server 206 in order to: (i) establish an association between management controller 202 and the data processing system, and (ii) to establish that management controller 202 is trusted by server 206.

TPM 204 may be trusted by server 206 at the time of the occurrence of the registration event. Therefore, in order to establish management controller 202 as a trusted entity for communications with server 206, TPM 204 may leverage its status as a trusted entity and cryptographically sign an identifier for management controller 202.

At interaction 208, a request for an identifier may be provided to management controller 202 by hardware resources 200. The request for the identifier may be generated and provided to management controller 202 in the form of a message using a side band communication channel of the data processing system.

At interaction 210, the identifier for the management controller may be provided to hardware resources 200 by management controller 202 in response to the request for the identifier. The identifier may be any unique identifying information (e.g., a string of numbers and/or letters) for management controller 202 and may be provided to hardware resources 200 via a message using the side band communication channel. Upon receiving the identifier, hardware resources 200 may request that TPM 204 cryptographically sign the identifier thereby attesting that hardware resources 200 and management controller 202 may be trusted by server 206 at the time of signing.

At interaction 212, a request to sign the identifier is provided to TPM 204 by hardware resources 200. The request to sign the identifier may include at least the identifier and/or any other information. The request to sign the identifier may be generated and provided to TPM 204 in the form of a message using the side band communication channel of the data processing system. By providing the request to sign the identifier (along with the identifier) to TPM 204, TPM 204 may determine whether to fulfil the request to cryptographically sign the identifier.

In response to receiving the request to sign the identifier, TPM 204 may perform identifier signing process 220. During identifier signing process 220, TPM 204 may determine whether to sign the identifier. To do so, TPM 204 may determine whether a security posture of hardware resources 200 is acceptable (e.g., meets a threshold indicating a standard for security). The threshold may be a previously established threshold provided to TPM 204, for example, by the manufacturer of data processing system 140.

TPM 204 may assess the security posture of hardware resources 200 during each startup process for data processing system 140 and, therefore, may possess an entry in a log indicating the security posture of hardware resources 200 at the time of the registration event. TPM 204 may assess the security posture of hardware resources 200 during each start up process, for example, by verifying that software applications running during start up of hardware resources 200 are expected and authorized software applications.

If the security posture is acceptable (e.g., meets the threshold), TPM 204 may sign the identifier. TPM 204 may sign the identifier using a second private key of a second public private key pair distributed to TPM 204 by the manufacturer of data processing system 140. The second private key of the second public private key pair may be kept secret by TPM 204 and may not be known by hardware resources 200.

By signing the identifier, TPM 204 may indicate that the security posture of hardware resources 200 is sufficient for server 206 to trust communications from hardware resources 200 at the time of signing. In addition, by signing the identifier, TPM 204 may indicate, to a recipient of the signed identifier, that management controller 202 is a trusted entity associated with data processing system 140.

At interaction 214, the signed identifier is provided to hardware resources 200 by TPM 204. The signed identifier may be provided to hardware resources 200 in the form of a message using the side band communication channel. By providing the signed identifier to hardware resources 200, TPM 204 may indicate that hardware resources 200 are trusted by TPM 204 at the time of the signing. Due to the trust previously established between server 206 and TPM 204, the signed identifier may allow server 206 to trust communications from hardware resources 200.

At interaction 216, a registration request is provided to server 206 by hardware resources 200. The registration request may include the signed identifier and/or any other information and may request that server 206 recognize management controller 202 as a trusted entity that may perform management functions for data processing system 140. The registration request may be provided to server 206 via a message using an in band communication channel and via a first network endpoint associated with hardware resources 200. The in band communication channel may be a separate communication channel from the side band communication channel utilized during interactions In response to receipt of the registration request, server 206 may perform registration process 222 to attempt to register management controller 202. During registration process 222, server 206 may use a second public key of the second public private key pair to verify that the signed identifier was signed using the second private key of the second public private key pair. By doing so, server 206 may verify that management controller 202 is considered a trusted entity and that management controller 202 is associated with the data processing system. If the signed identifier is verified, server 206 may treat management controller 202 as a trusted entity to perform management functions for the data processing system.

At interaction 218, a notification of successful registration is provided to hardware resources 200 by server 206. The notification of successful registration may be generated and provided to hardware resources 200 in the form of a message using the in band communication channel of the data processing system. By providing the notification of successful registration to hardware resources 200, hardware resources 200 may indicate, to management controller 202, that management controller 202 has been registered and may proceed to communicate with server 206 to perform management functions for data processing system 140.

Turning to FIG. 2B, a second interaction diagram in accordance with an embodiment is shown. The second interaction diagram may illustrate processes and interactions that may occur during registration of a management controller (e.g., 202) with a second server (e.g., server 230). Server 230 may be similar to server 104 described in FIG. 1A and may include an orchestrator and an IoT hub. The orchestrator may be responsible for maintaining registrations, managing lists of entitlements, verifying signatures, etc. The IoT hub may be responsible for directing communications between the orchestrator and other components of FIG. 2B (e.g., management controller 202 via an out of band communication channel, hardware resources 200 via an in band communication channel).

Following registration of management controller 202 with server 206 (e.g., shown in FIG. 2A), management controller 202 may initiate registration of management controller 202 with server 230 by performing key pair generation 232 process. Key pair generation 232 process may include generation of a public private key pair via execution of any key pair generation algorithm. A private key of the public private key pair may be kept secret by management controller 202 and not distributed to any other entities throughout the distributed environment.

Following key pair generation 232 process, at interaction 234, management controller 202 may provide a message to hardware resources 200. Interaction 234 may initiate a certificate signing request (CSR) process with server 206 The CSR process may include providing a signed data package to server 206 as part of a request for server 206 to generate an identity certificate for data processing system 140.

Specifically, the message may include at least a public key of the public private key pair and an identifier for management controller 202. The message may be signed by management controller 202 using the private key. The message may be provided to hardware resources 200 via a side band communication channel of the data processing system.

At interaction 236, the message may be provided, via an in band communication channel, to server 206 to initiate the CSR process.

Following receipt of the message, and as part of the CSR process, server 206 may perform public key registration 238 process. Public key registration 238 process may include verifying the signature included in the message and generating an identity certificate for the data processing system.

At interaction 240, following public key registration 238 process, server 206 and server 230 may exchange enrollment data and server data. Specifically, server 206 may provide the enrollment data to the orchestrator of server 230 and, in response, the orchestrator may provide the server data to server 206. The enrollment data may include: (i) the identity certification for the data processing system, (ii) the public key, and/or (iii) any other information usable by server 230 to identify management controller 202. The server data may include information usable to direct communications to the orchestrator via the IoT hub and/or any other IoT hub metadata.

Server 206 and the orchestrator may be in a trusted state during the registration of management controller 202 with the orchestrator and, therefore, server 206 and the orchestrator of server 230 may securely exchange information during the registration of management controller 202 with the orchestrator. Server 206 and the orchestrator (e.g., and/or other components of server 230) may be in a trusted state due to possession of a shared secret and/or due to other means of establishing trust.

At interaction 242, hardware resources 200 may receive an acknowledgement from server 206 via the in band communication channel. The acknowledgement may include: (i) information usable to direct communications to the orchestrator, and (ii) information that was previously provided to the orchestrator by the server during the initiation of the registration of the management controller with the orchestrator.

The information usable to direct communications to the orchestrator may include IoT hub metadata indicating, for example, a media access control (MAC) address associated with a network endpoint for the IoT hub and/or other information.

The information that was previously provided to the orchestrator by the server during the initiation of the registration of the management controller with the orchestrator may include (i) the identity certification for the data processing system, (ii) the public key, and/or (iii) any other information usable by server 230 to identify management controller 202.

At interaction 244, hardware resources 200 may provide the acknowledgement to management controller 202 via the side band communication channel in the form of a message.

At interaction 246, hardware resources 200 may provide a registration request to server 230. Prior to providing the registration request to server 230, the registration request may be signed by management controller 202. Therefore, interaction 246 may include: (i) providing the registration request to management controller 202 via the side band communication channel, management controller 202 performing signing process 248 to sign the registration request using the private key of the public private key pair kept secret by management controller 202, (iii) receiving, by hardware resources 200, the signed registration request from management controller 202, and (iv) providing, by hardware resources 200 and via the in band communication channel, the registration request to server 230.

The registration request may be a request to register management controller 202 with the orchestrator of server 230. The registration request may include a payload (e.g., any amount of data related to management controller 202 encapsulated in a data structure) signed using the private key. The data included in the payload may include: (i) the identifier for the management controller, (ii) the identity certificate for the data processing system, and/or (iii) any other information usable to initiate contact between the data processing system and the orchestrator.

Doing so may allow server 230 to verify the signature using the public key of the public private key pair. However, as this registration request originated from hardware resource 200 and not management controller 202 itself, server 230 may not yet trust management controller 202.

The orchestrator of server 230 may verify the signature of the registration request using the public key of the public private key pair generated by management controller 202 and may provide, in response to the registration request, an acknowledgement of verification to hardware resources 200 via the in band communication channel (not shown). Hardware resources 200 may provide a copy of this acknowledgement of verification to server 206 as part of the process of registration of management controller 202 with server 230 via the in band communication channel (not shown).

Following interaction 246, hardware resources 200 may provide a notification to server 206 indicating that the orchestrator successfully received the registration request and successfully verified the signature included in the registration request via the in band communication channel (not shown).

Server 230 may then initiate contact with management controller 202 directly via an out of band communication channel thereby bypassing hardware resources 200. At interaction 250, management controller 202 may obtain a challenge from server 230 via the out of band communication channel. The challenge may include a request for the at least a portion of the information that was previously provided to the orchestrator by server 206 during the initiation of the registration of management controller 202 with the orchestrator.

In a first example, the orchestrator of server 230 may generate the challenge based on at least a portion of the enrollment data provided to server 230 at interaction 240. In a second example (not shown), the challenge may be generated by server 206 and server 206 may provide the challenge to the IoT hub of server 230 prior to interaction 250. The IoT hub may then direct the challenge in the form of a message to management controller 202 via the out of band communication channel.

In response to receiving the challenge at interaction 250, management controller 202 may generate, at interaction 252, a challenge response and may provide the challenge response to the IoT hub of server 230 via the out of band communication channel. Management controller 202 may generate the challenge response by obtaining information responsive to one or more requests for information included in the challenge and encapsulating the information in a data structure.

Server 230 may verify the responses included in the challenge response and/or may provide, by the IoT hub, the challenge response to server 206 at interaction 254. If provided to server 206, server 206 may verify the responses included in the challenge response to complete the registration of management controller 202. The challenge response provided by server 230 at interaction 254 may include the challenge response and/or may include an acknowledgement of successful verification of the responses included in the challenge response by server 230.

By doing so, trust may be established between server 230, management controller 202, and server 206. Consequently, the orchestrator of server 230 may interact with management controller 202 (via the out of band communication channel and the IoT hub) to facilitate management of operation of the data processing system. For example, management controller 202 and the orchestrator may interact to update and/or implement entitlements for the data processing system.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1C may perform various methods to manage data processing systems. FIG. 3 illustrates methods that may be performed by the components of FIGS. 1A-1C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of registering a management controller in accordance with an embodiment is shown. The method may be performed, for example, by a data processing system, and/or any other entity.

At operation 300, an occurrence of a registration event for a management controller of a data processing system may be identified. The occurrence of the registration event may be identified by: (i) performing a setup process for a new user of the data processing system (e.g., powering on and logging in using access credentials by the new user), (ii) obtaining a notification that the occurrence of the registration event has occurred for the management controller from another entity, and/or (iii) other methods.

At operation 302, the management controller may be registered with the server. Registering the management controller with the server may include: (i) obtaining, by the hardware resources, an identifier for the management controller, (ii) verifying, by a trusted platform module (TPM) of the data processing system, a security posture of hardware resources of the data processing system, (iii) if the security posture is acceptable, signing, by the TPM, the identifier using a second private key of a second public private key pair, the second private key being kept secret by the TPM and only being usable when the security posture is acceptable, (iv) providing, by the hardware resources, the signed identifier to the server, and/or (v) obtaining, by the hardware resources and responsive to the provided signed identifier, a notification regarding whether the management controller has been registered with the server, and while the management controller is registered with the server, the management controller communicates with the server directly via an out of band communication channel.

The identifier for the management controller may be obtained by receiving, in the form of a message, the identifier from the management controller via a side band communication channel of the data processing system. The identifier may be obtained automatically in response to the occurrence of the registration event and/or may be requested via the side band communication channel and obtained in response to the request.

Verifying the security posture of the hardware resources may include: (i) reading a security posture of the hardware resources from storage, the security posture being generated during a most recent startup procedure for the data processing system, (ii) comparing the security posture to a threshold, the threshold indicating parameters of the security posture considered acceptable for treating the hardware resources as trusted entities, and/or (iii) determining whether the security posture meets the threshold.

Verifying the security posture may also include: (i) obtaining the security posture from another entity and comparing it to the threshold, (ii) providing the security posture and/or the threshold to another entity responsible for comparing the security posture to the threshold, and/or (iii) other methods.

Signing the identifier using the private key of the public private key pair may include: (i) obtaining the second public private key pair (e.g., from a manufacturer of the data processing system), (ii) generating a signed copy of the identifier using the second private key of the second public private key pair, and/or (iii) other methods. Generating the signed copy of the identifier may include generating cryptographic information using a payload and the second private key (e.g., a hash of the payload and the second private key).

Providing the signed identifier to the server may include transmitting, in the form of a message, the signed identifier to the server via an in band communication channel of the data processing system.

Obtaining the notification may include receiving, via an in band communication channel, a message from the server, the message including at least the notification.

At operation 304, a public key of a public private key pair may be registered with the server to prompt the server to initiate registration of the management controller with the orchestrator. Registering the public key may include performing a certificate signing request (CSR) process. The CSR process may include: (i) generating the public private key pair, the private key of the public private key pair being kept secret by the management controller, (ii) encapsulating at least an identifier for the management controller and a public key of the public private key pair generated by the management controller in a data structure, (iii) signing the data structure using the private key of the public private key pair, (iv) providing, via an in band communication channel, the signed data structure in the form of a message to the server, and/or (v) other methods.

At operation 306, an acknowledgement of the initiation of the registration of the management controller with the orchestrator may be obtained, the initiation being made by the server. Obtaining the acknowledgement may include receiving, in the form of a message via the in band communication channel, a notification from the server indicating that the registration of the management controller with the orchestrator has been initiated. Refer to FIG. 2B for additional details regarding the initiation of the registration of the management controller with the orchestrator.

At operation 308, a request to register the management controller may be provided, based on the acknowledgement, to the orchestrator. Providing the request may include: (i) providing the request to the management controller via a side band communication channel, (ii) signing the request using the private key, (iii) obtaining the signed request from the management controller via the side band communication channel, (iv) providing the signed request to the orchestrator in the form of a message over the in band communication channel, and/or (v) other methods.

Providing the request to the management controller via the side band communication channel may include obtaining the request and transmitting the request via the side band communication channel in the form of a message. Obtaining the request may include: (i) generating the request, (ii) reading the request from storage, and/or (iii) other methods.

Signing the request using the private key may include generating cryptographic information using the request and the private key (e.g., a hash of the request and the second private key).

Obtaining the signed request from the management controller via the side band communication channel may include receiving, in the form of a message, the signed request via the side band communication channel.

At operation 310, a challenge may be obtained, via an out of band communication channel, from the orchestrator as part of the registration of the management controller. Obtaining the challenge may include receiving, via an interaction with an IoT hub associated with the orchestrator, a message including the challenge over the out of band communication channel.

At operation 312, a response to the challenge may be provided, via the out of band communication channel, to the orchestrator to complete the registration of the management controller. Providing the response may include: (i) generating the response, (ii) encapsulating the response in a data structure, (iii) transmitting the data structure, in the form of a message, via the out of band communication channel, the message being directed to the IoT hub associated with the orchestrator, and/or (iv) other methods.

Generating the response may include: (i) identifying a first portion of the challenge, (ii) identifying a portion of data relevant to the first portion of the challenge (e.g., via reading the portion of the data relevant to the first portion of the challenge from storage), (iii) adding the portion of the data relevant to the first portion of the challenge to the challenge response, and/or (iv) other methods.

At operation 314, computer-implemented services may be provided using the completed registration. Providing the computer-implemented services may include: (i) receiving, from the orchestrator, an updated list of entitlements for the data processing system via the out of band communication channel, (ii) modifying hardware and/or software components of the data processing system to implement the updated list of the entitlements, and/or (iii) other methods.

Performing the computer-implemented services may include interactions with the server and/or the orchestrator to manage operation of any components of the data processing system over time without departing from embodiments disclosed herein.

The method may end following operation 314.

Figure 4:
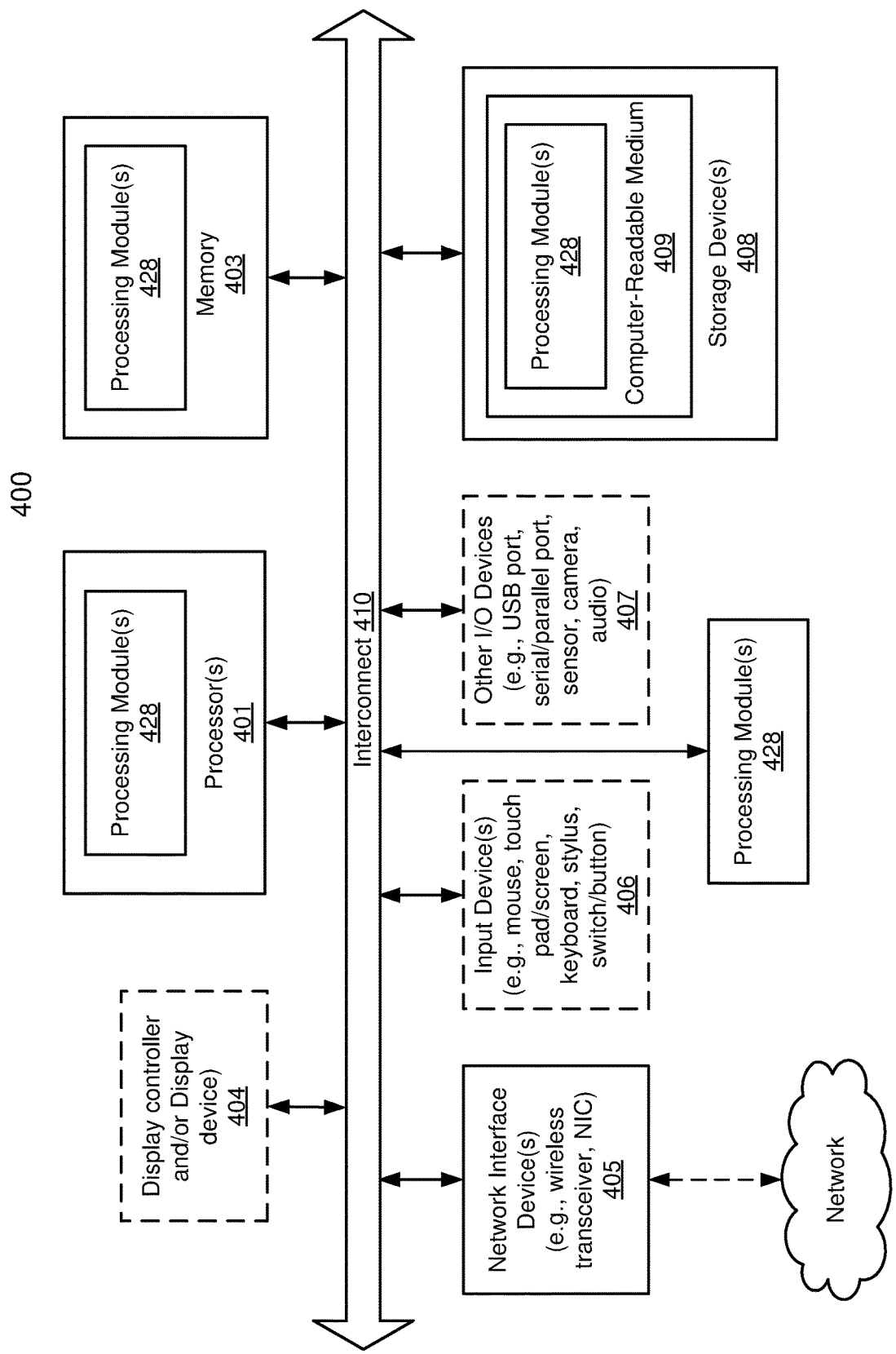
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of registering a management controller of a data processing system, the method comprising:
   identifying an occurrence of a registration event for the management controller, the registration event indicating that the management controller is to be registered with a server and an orchestrator;
   registering the management controller with the server;
   registering, with the server, a public key of a public private key pair, a private key of the public private key pair being kept secret by the management controller, to prompt the server to initiate registration of the management controller with the orchestrator;
   obtaining an acknowledgement of initiation of the registration of the management controller with the orchestrator, the initiation being made by the server;
   based on the acknowledgement, providing, by hardware resources of the data processing system, a request to register the management controller to the orchestrator, the request comprising a payload signed by the management controller using the private key to continue the registration of the management controller;

obtaining, by the management controller via an out of band communication channel, a challenge from the orchestrator as part of the registration of the management controller;

providing, by the management controller and via the out of band communication channel, a response to the challenge to the orchestrator to complete the registration of the management controller with the orchestrator; and providing computer-implemented services using the completed registration.

2. The method of claim 1, wherein registering the management controller with the server comprises:

obtaining, by the hardware resources, an identifier for the management controller;

verifying, by a trusted platform module (TPM) of the data processing system, a security posture of hardware resources of the data processing system;

in an instance of the verifying where the security posture is acceptable:

signing, by the TPM, the identifier using a second private key of a second public private key pair, the second private key being kept secret by the TPM and only being usable when the security posture is acceptable;

providing, by the hardware resources, the signed identifier to the server; and obtaining, by the hardware resources and responsive to the provided signed identifier, a notification regarding whether the management controller has been registered with the server, and while the management controller is registered with the server, the management controller communicates with the server directly via an out of band communication channel.

3. The method of claim 2, wherein the management controller is registered by the server using a second public key of the second public private key pair to verify that the second private key used to sign the signed identifier is the second private key of the second public private key pair.

4. The method of claim 1, wherein, during the registration of the management controller with the server, the server and the orchestrator are in a trusted state.

5. The method of claim 1, wherein the public private key pair is generated by the management controller as part of registering the management controller with the orchestrator.

6. The method of claim 1, wherein registering the public key with the server comprises performing a certificate signing request process.

7. The method of claim 1, wherein the acknowledgement comprises:

information usable to direct communications to the orchestrator; and information that was previously provided to the orchestrator by the server during the initiation of the registration of the management controller with the orchestrator.

8. The method of claim 7, wherein the challenge comprises a request for the at least a portion of the information that was previously provided to the orchestrator by the server during the initiation of the registration of the management controller with the orchestrator.

9. The method of claim 1, wherein providing the request to register the management controller to the orchestrator comprises:

providing, by the hardware resources, the request to the management controller via a side band communication channel;

signing, by the management controller, the request using the private key; and obtaining, by the hardware resources, the signed request from the management controller via the side band communication channel.

10. The method of claim 1, wherein the data processing system comprises a network module adapted to separately advertise network endpoints for the management controller and the hardware resources, the network endpoints being usable by the server and/or the orchestrator to address communications to the hardware resources using an in band communication channel and the management controller using the out of band communication channel.

11. The method of claim 10, wherein the management controller and the network module are on separate power domains from the hardware resources so that the management controller and the network module are operable while the hardware resources are inoperable.

12. The method of claim 10, wherein the out of band communication channel runs through the network module, and an in band communication channel that services the hardware resources also runs through the network module.

13. The method of claim 10, wherein the network module hosts a transmission control protocol/internet protocol (TCP/IP) stack to facilitate network communications via the out of band communication channel.

14. A non-transitory machine-readable medium having instructions stored therein, which when executed by a processor, cause the processor to perform operations for registering a management controller of a data processing system, the operations comprising:

identifying an occurrence of a registration event for the management controller, the registration event indicating that the management controller is to be registered with a server and an orchestrator;

registering the management controller with the server;

registering, with the server, a public key of a public private key pair, a private key of the public private key pair being kept secret by the management controller, to prompt the server to initiate registration of the management controller with the orchestrator;

obtaining an acknowledgement of initiation of the registration of the management controller with the orchestrator, the initiation being made by the server;

based on the acknowledgement, providing, by hardware resources of the data processing system, a request to register the management controller to the orchestrator, the request comprising a payload signed by the management controller using the private key to continue the registration of the management controller;

obtaining, by the management controller via an out of band communication channel, a challenge from the orchestrator as part of the registration of the management controller;

providing, by the management controller and via the out of band communication channel, a response to the challenge to the orchestrator to complete the registration of the management controller with the orchestrator; and providing computer-implemented services using the completed registration.

15. The non-transitory machine-readable medium of claim 14, wherein registering the management controller with the server comprises:

obtaining, by the hardware resources, an identifier for the management controller;

verifying, by a trusted platform module (TPM) of the data processing system, a security posture of hardware resources of the data processing system;

in an instance of the verifying where the security posture is acceptable:

signing, by the TPM, the identifier using a second private key of a second public private key pair, the second private key being kept secret by the TPM and only being usable when the security posture is acceptable;

providing, by the hardware resources, the signed identifier to the server; and obtaining, by the hardware resources and responsive to the provided signed identifier, a notification regarding whether the management controller has been registered with the server, and while the management controller is registered with the server, the management controller communicates with the server directly via an out of band communication channel.

16. The non-transitory machine-readable medium of claim 15, wherein the management controller is registered by the server using a second public key of the second public private key pair to verify that the second private key used to sign the signed identifier is the second private key of the second public private key pair.

17. The non-transitory machine-readable medium of claim 14, wherein, during the registration of the management controller with the orchestrator, the server and the orchestrator are in a trusted state.

18. A data processing system, comprising:
a processor; and
a memory coupled to the processor to store instructions, which when executed by the processor, cause the processor to perform operations for registering a management controller of a data processing system, the operations comprising:

identifying an occurrence of a registration event for the management controller, the registration event indicating that the management controller is to be registered with a server and an orchestrator;

registering the management controller with the server;

registering, with the server, a public key of a public private key pair, a private key of the public private key pair being kept secret by the management controller, to prompt the server to initiate registration of the management controller with the orchestrator;

obtaining an acknowledgement of initiation of the registration of the management controller with the orchestrator, the initiation being made by the server;

based on the acknowledgement, providing, by hardware resources of the data processing system, a request to register the management controller to the orchestrator, the request comprising a payload signed by the management controller using the private key to continue the registration of the management controller;

obtaining, by the management controller via an out of band communication channel, a challenge from the orchestrator as part of the registration of the management controller;

providing, by the management controller and via the out of band communication channel, a response to the challenge to the orchestrator to complete the registration of the management controller with the orchestrator; and providing computer-implemented services using the completed registration.

19. The data processing system of claim 18, wherein registering the management controller with the server comprises:

obtaining, by the hardware resources, an identifier for the management controller;

verifying, by a trusted platform module (TPM) of the data processing system, a security posture of hardware resources of the data processing system;

in an instance of the verifying where the security posture is acceptable:

signing, by the TPM, the identifier using a second private key of a second public private key pair, the second private key being kept secret by the TPM and only being usable when the security posture is acceptable;

providing, by the hardware resources, the signed identifier to the server; and obtaining, by the hardware resources and responsive to the provided signed identifier, a notification regarding whether the management controller has been registered with the server, and while the management controller is registered with the server, the management controller communicates with the server directly via an out of band communication channel.

20. The data processing system of claim 19, wherein the management controller is registered by the server using a second public key of the second public private key pair to verify that the second private key used to sign the signed identifier is the second private key of the second public private key pair.

* * * * *